United States Patent
Tsukada

[19]

[11] Patent Number: 5,729,172
[45] Date of Patent: Mar. 17, 1998

[54] BOOSTER CIRCUIT CAPABLE OF SUPPRESSING FLUCTUATIONS IN THE BOOSTED VOLTAGE

[75] Inventor: Shyuichi Tsukada, Tokyo, Japan

[73] Assignee: NEC Corporation, Tokyo, Japan

[21] Appl. No.: 594,170

[22] Filed: Jan. 31, 1996

[30] Foreign Application Priority Data

Feb. 1, 1995 [JP] Japan ................... 7-014843

[51] Int. Cl.$^6$ ................................................. G05F 1/10
[52] U.S. Cl. ......................... 327/536; 327/390; 327/589; 363/59; 363/60; 307/110
[58] Field of Search ....................... 327/536, 157, 327/390, 589; 363/59, 60; 307/110; 365/189.09, 218, 226

[56] References Cited

U.S. PATENT DOCUMENTS

| | | | |
|---|---|---|---|
| 4,710,647 | 12/1987 | Young | 327/536 |
| 5,184,035 | 2/1993 | Sugibayashi | 327/536 |
| 5,367,489 | 11/1994 | Park et al. | 327/536 |
| 5,524,095 | 6/1996 | Someya et al. | 365/189.09 |
| 5,537,077 | 7/1996 | Schnizlein | 327/589 |
| 5,546,031 | 8/1996 | Seesink | 327/536 |

Primary Examiner—Timothy P. Callahan
Assistant Examiner—Kenneth B. Wells
Attorney, Agent, or Firm—Sughrue, Mion, Zinn, Macpeak & Seas, PLLC

[57] ABSTRACT

In a booster circuit for use in a semiconductor integrated circuit device that includes: a voltage detection circuit for detecting the boosted voltage with respect to a reference voltage; a pulse oscillator circuit in which oscillation is controlled in accordance with the results of voltage detection; and a charge pump circuit that uses the oscillation pulses to charge capacitors and generates a boosted voltage; a transfer control circuit is inserted between the pulse oscillator circuit and the charge pump circuit that is composed of a transfer gate which is ON/OFF-controlled by the detection output of the voltage detection circuit and a latch circuit. When the boosted voltage is higher than the set value and the detection output changes to low level, this transfer gate is immediately turned OFF, the oscillation output immediately preceding the OFF state is latched in the latch circuit, and oscillation pulses are not transferred to the charge pump circuit. During the time that the boosted voltage is higher than the set value, the latch signal held in the latch circuit is inputted and the logic of the oscillator circuit output and that of the latch circuit are reverse phased with respect to each other, and therefore, the charge pump circuit may be activated instantaneously when the boosted voltage falls below the set value.

3 Claims, 6 Drawing Sheets

BOOSTER CIRCUIT CAPABLE OF SUPPRESSING FLUCTUATIONS IN THE BOOSTED VOLTAGE

BACKGROUND OF THE INVENTION

1. Field of the Invention

The present invention relates to a booster circuit, and particularly relates to a booster circuit used in a semiconductor integrated circuit device such as a Dynamic Random Access Memory (hereinafter abbreviated as DRAM).

2. Description of the Related Art

In recent years, DRAM is on the way of development which employs a boosted voltage for the word-line drive of a memory cell array within a memory chip that is constantly generated by a booster circuit. FIG. 1(A) shows one example of a booster circuit developed for this purpose, and FIG. 1(B) shows the operation timing waveform of such a booster circuit.

Referring first to FIG. 1(A), such a booster circuit is made up of voltage detection circuit 1 which compares the level of boosted voltage $V_B$ with a reference voltage $V_{REF}$ and detects the sizes of each; pulse oscillator circuit 2, the oscillation of which is controlled according to the detection results of voltage detection circuit 1; charge pump circuit 3 which charges a capacitor using the output pulses of pulse oscillator circuit 2 and generates boosted voltage $V_B$; and compensating capacitance $C_L$.

Voltage detection circuit 1 is constructed as shown in FIG. 2, the boosted voltage $V_B$ being voltage-divided by resistance $R_1$ and $R_2$ and compared with reference voltage $V_{REF}$ at comparator $D_1$. Boost control signal $\phi_1$, which is the comparator output, becomes high level when the divided voltage of boosted voltage $V_B$ is lower than reference voltage $V_{REF}$, and conversely, becomes low level when the divided voltage is higher.

As shown in FIG. 1(A), pulse oscillator circuit 2 is basically constructed as a ring oscillator. This ring oscillator is made up of inverters $I_2$–$I_4$ in cascade connection, the output of the last-section inverter $I_4$ being fed back to the input of the first-section inverter $I_2$ by way of transfer gate $TG_1$. Inverters $I_5$ and $I_6$ are output buffers.

As shown in the figure, since parasitic capacitance $C_3$–$C_5$ exists at each node within the ring oscillator and signal transition is therefore slow at each node, buffering is required for wave shaping. In this example, a transfer gate $TG_1$ which is ON/OFF-controlled by oscillation control signal $\phi_1$ is provided so that oscillation is performed only when oscillation control signal $\phi_1$ is high level and oscillation signal $\phi_2$ is generated to the output in pulse form.

When $\phi_1$ is low level, the input node $N_1$ of inverter $I_2$ is clamped at low level by inverter $I_1$ and transistor $Q_1$, thereby fixing oscillation output $\phi_2$ at high level.

Generally, when a ring oscillator circuit is halted, floating at each node is prevented by clamping input and output nodes at low level or high level, as in this example circuit.

FIG. 3 shows an example of charge pump circuit 3 which adopts what is known as a complementary circuit system, whereby pulse oscillation signal $\phi_2$ of oscillator circuit 2 is converted to complementary pulses by inverters $I_7$, $I_8$ and inverter $I_9$, and boosted voltage $V_B$ is generated by controlled charging of each of capacitors $C_1$ and $C_2$ by these respective complementary pulses.

Here, NMOS $Q_1$–$Q_4$ are transistors which perform switching action for directing the charged voltage of each of capacitors $C_1$ and $C_2$ to a boosted voltage line.

To summarize the operation of these circuits, when for example, a word-line drive circuit is connected to boosted voltage $V_B$ line, thereby becoming a load of this boosted voltage $V_B$, and consuming power, boosted voltage $V_B$ falls below a set value which is defined as $V_{REF} \times (R_1 + R_2)/R_2$ in FIG. 2. Oscillation control signal $\phi_1$ hereupon becomes high level and oscillation pulse $\phi_2$ is generated by oscillator circuit 2, causing charge pump circuit 3 to operate and boost voltage $V_B$. When voltage $V_B$ is higher than the set value, oscillation control signal $\phi_1$ becomes low level, causing oscillator circuit 2 to halt oscillation, thereby halting boosting by charge pump circuit 3. Accordingly, boosting of voltage $V_B$ is stopped. FIG. 1(B) shows the relation between $\phi_1$ and $\phi_2$. Essentially, voltage $V_B$ is constantly maintained at a high voltage within a certain range of fluctuation centering on the set value.

Preferably, the level of boosted voltage $V_B$ should fluctuate as little as possible from a set value. As examples to illustrate the reason for this, FIG. 4 shows a circuit diagram according to the prior art for DRAM of a word-line drive circuit using boosted nodes $V_B$, and FIG. 5 shows the operating waveform of such a circuit. Using these figures, the operation of this circuit will be briefly explained.

Control signal $\Psi_2$ is produced by circuit block 91 driven by voltage $V_{CC}$, and word drive signal $\Psi_3$ is produced by circuit block 92 which takes voltage $V_B$ as power source, signals $\Psi_2$ and $\Psi_3$ both undergoing transition at a timing delayed from input signal $\phi_1$ by exactly the delay times of circuit blocks 91, 92, respectively.

In FIG. 4, circuit block 91 is made up of inverters $I_{11}$, $I_{12}$ and NAND gates $G_1$, $G_2$ and generates control signal $\Psi_2$ based on input signal $\Psi_1$. NAND gate $G_1$ is enabled by a memory block select signal, and NAND gate $G_2$ is enabled by the output of NAND gate $G_1$ inverted by inverter $I_{12}$ and gates address signals.

Circuit block 92 is made up of an F/F (flip-flop) composed of transistors $Q_5$–$Q_8$ driven by complementary signals of input signal $\Psi_1$ by using inverter $I_{10}$, and a CMOS inverter of two-stage construction which receives the output of the F/F. The CMOS inverter is composed of transistors $Q_9$–$Q_{12}$ (i.e., cascading pairs of FETS $Q_9$, $Q_{10}$, and $Q_{11}$, $Q_{12}$), and the output of the CMOS inverter serves as word drive signal $\Psi_3$.

Circuit block 93 is composed of inverter $I_{13}$, which inverts control signal $\Psi_2$; transistor $Q_{14}$, which is driven by the output of inverter $I_{13}$; transistor $Q_{13}$, which conveys control signals to transistor $Q_{15}$; and transistor $Q_{15}$, the gate of which is driven by the output of transistor $Q_{13}$ and the source of which is supplied by word drive signal $\Psi_3$. The common drain output of transistors $Q_{14}$ and $Q_{15}$ is connected to the word line.

Circuit block 93 for this word-line drive adopts a self-booting circuit construction. When a word line rises, control signal $\Psi_2$ first rises from low level to $V_{CC}$, and self-booting node voltage $\Psi_4$ is precharged to $V_{CC}-V_t$ ($V_t$ being the threshold voltage of $Q_{13}$) by NMOS transistor $Q_{13}$, the gate of which is connected to $V_{CC}$. Word drive signal $\Psi_3$ then rises from 0V to $V_B$, whereby self-booting node voltage $\Psi_4$ rises to an extremely high level through capacitance coupling between diffuse layers and the gate of NMOS transistor $Q_{15}$, and the word line rises to the potential of $V_B$ by turning ON transistor $Q_{15}$. At this time, voltage $\Psi_4$ is maintained at an extremely high level because transistor $Q_{13}$ is OFF.

If signal $\Psi_3$ rises faster than signal $\Psi_2$, the load of node voltage $\Psi_4$ received from capacitance coupling from transistor $Q_{15}$ escapes to the signal $\Psi_2$ side by way of transistor $Q_{13}$, and the word line therefore does not rise to the potential of $V_B$. Signal $\Psi_2$ must accordingly be caused to rise before signal $\Psi_3$ if this self-booting circuit is to operate normally.

Because the operation speed of the circuit blocks largely depends on the power-supply voltage, the timing of signal $\Psi_3$ largely depends on the level of $V_B$. As a result, the potential of $V_B$ must be accurately generated in accordance with the set value to ensure that the operation timing of signal $\Psi_3$ is always accurate.

The timing must be designed with care because a careless timing design will readily lead to the above-described operation errors in cases in which the potential of $V_B$ fluctuates over a wide range. Under conditions in which signal $\Psi_3$ operates at maximum speed, i.e., under conditions in which $V_B$ is at the maximum peak potential within the range of fluctuation in the potential, the delay times of circuit blocks 91, 92 must be set such that signal $\Psi_3$ is later than signal $\Psi_2$.

Accordingly, as the range of fluctuation in the potential of $V_B$ increases, the timing of the rise of a word line must be increasingly delayed, and the access speed must be correspondingly retarded. Moreover, the timing of signals that must be operated after rise of the word line (this is the timing of activation of sensor amps in a DRAM, and is not specifically shown in the figures) must be determined for conditions in which a word line operates at minimum speed, i.e., under conditions in which $V_B$ is at a minimum peak potential within the range of fluctuation in potential. Consequently, greater fluctuation in the potential of $V_B$, necessitates designs having slower access speed.

One case has been described hereinabove, but common sense dictates that fluctuation in the potential of $V_B$ is preferably kept to a minimum. As one measure against such fluctuation, a method can be proposed according to which, in the booster circuit shown in FIG. 1(A), fluctuation in the potential of VB is limited by halting the operation of the charge pump circuit as quickly as possible when $V_B$ exceeds a set level and control signal $\phi_1$ becomes low level, and in addition, by initiating the operation of the charge pump circuit as quickly as possible when, for example, current consumption in a load circuit causes $V_B$ to fall below the set level and control signal $\phi_1$ becomes high level.

FIG. 1(B) shows examples of the operating waveform of signals $\phi_1$ and $\phi_2$ of the prior-art booster circuit shown in FIG. 1(A). Charge pump circuit 3 outputs electric charge to $V_B$ at both the rise and fall transitions of signal $\phi_2$, and therefore serves to raise the potential of $V_B$ at all times from $t_1$ to $t_8$.

At timing $t_F$, the potential of $V_B$ exceeds the set value and signal $\phi_1$ changes to low level, but at $t_4$ and $t_5$ after $t_F$, signal $\phi_2$ changes, inevitably causing charge pump circuit 3 to operate.

Transition occurs in signal $\phi_2$ at $t_4$ even though signal $\phi_1$ becomes low level at $t_F$ and transfer gate $TG_1$ turns OFF because a signal in transition remains within oscillator circuit 2 (the inverter chain of ring oscillator section and buffer ring section) and this signal is outputted to signal $\phi_2$ after $t_F$.

In addition, transition occurs at $t_5$ because the change of signal $\phi_1$ to low level causes NMOS transistor $Q_1$ to turn ON, and change of node $N_1$ from high to low level causes a transition from low to high level to be outputted to signal $\phi_2$ after the passage of exactly the delay time of inverter chain of oscillator circuit 2.

In other words, a booster circuit of the prior art suffers from the drawback that charge pump circuit 3 operates even though the transition of $V_B$ is higher than the set value, thereby causing the potential of $V_B$ to rise even higher.

Moreover, when the potential of $V_B$ falls below the set value at timing $t_R$ due to, for example, current consumption by a load circuit, and signal $\phi_1$ becomes high level, charge pump circuit 3 does not begin to operate until the transition of signal $\phi_2$ at $t_6$, which is considerably later than $t_R$. This delay after $t_R$ before signal $\phi_2$ undergoes transition occurs even though the change of signal $\phi_1$ to high level at time $t_R$ causes transfer gate $TG_1$ to turn ON because the time $t_6$ at which transfer gate $TG_1$ turns ON is delayed by the delay times of the ring oscillator section and buffer section of oscillator circuit 2.

The booster circuit of the prior art therefore suffers from the drawback that the charge pump circuit does not immediately operate even though the potential of $V_B$ has fallen below the set value. Consequently, the potential of $V_B$ fluctuates considerably with respect to the set value in a booster circuit of the prior art.

Another method of suppressing the degree of fluctuation in the potential of $V_B$ in the booster circuit of FIG. 1(A) involves increasing the value of $C_L$, which is the compensating capacitance of $V_B$, but $C_L$ cannot be infinitely increased owing to limits in the size of semiconductor circuit device. For example, $C_L$ set at the maximum limit for DRAM obtains a capacitance on the order of 5nF. In this case, the use of a prior-art booster circuit for word-line drive results in fluctuation of the potential of $V_B$ on the order of as much as ±100 mV.

SUMMARY OF THE INVENTION

The object of the present invention is to provide a booster circuit that can suppress the range of fluctuation of the boosted voltage to the utmost minimum.

The present invention is a booster circuit for obtaining a boosted voltage for use in a semiconductor integrated circuit device and which includes voltage detection means for detecting the size of a boosted voltage with respect to a set value of voltage, pulse oscillation means that generates an oscillating pulse when the boosted voltage is below the set value and halts generation of an oscillating pulse when the boosted voltage is higher than the set value in accordance with the detection results from the voltage detection means, transfer means that receives the oscillating pulse generated by the pulse oscillation means and controls transfer of the oscillating pulse to succeeding sections in accordance with detection results from the voltage detection means, and charge pump means located in the section following the transfer means that charges capacitors using the received oscillating pulse and generates boosted voltage.

According to an embodiment of the present invention, the transfer means includes switch means that turns transfer of oscillating pulses ON when the detection result indicates the boosted voltage is lower than the set value and turns transfer of the oscillating pulse OFF when the boosted voltage is higher than the set value, and latch means that, when the switch means turns OFF, latches and holds transfer output of the switch means immediately preceding the OFF state.

According to another embodiment of the present invention, the pulse oscillation means includes means that receives a latch signal held by the latch means during the time the boosted voltage is higher than the set value, and makes the logic of the output signal of the pulse oscillation means reverse phase with respect to the logic of that latch signal.

In other words, the present invention ON/OFF-controls the operation of the charge pump circuit instantaneously with respect to detection results of the boosted voltage by providing a transfer control circuit between the oscillator circuit and the charge pump circuit that is ON/OFF controlled according to the detection result of the voltage detection circuit. When the voltage detection circuit detects that the boosted voltage is higher than the set value, the transfer circuit is immediately turned OFF and oscillating pulses are not transmitted to the charge pump circuit. Further, this transfer circuit is constructed of a switch and a latch circuit whereby, when it is detected that the boosted voltage is lower than the set value, the switch is immediately turned ON and, at the same time, oscillation output voltage from immediately preceding turning OFF the switch that is latched in the latch circuit is fed back to the input of the oscillator circuit and the output logic of the oscillator circuit is invert-controlled such that oscillation operation commences practically instantaneously.

The above and other objects, features, and advantages of the present invention will become apparent from the following description based on the accompanying drawings which illustrate preferred embodiments of the present invention.

DETAILED DESCRIPTION OF THE PREFERRED EMBODIMENTS

Embodiments of the present invention are explained in the following description with reference to the accompanying drawings.

Figure 1A:
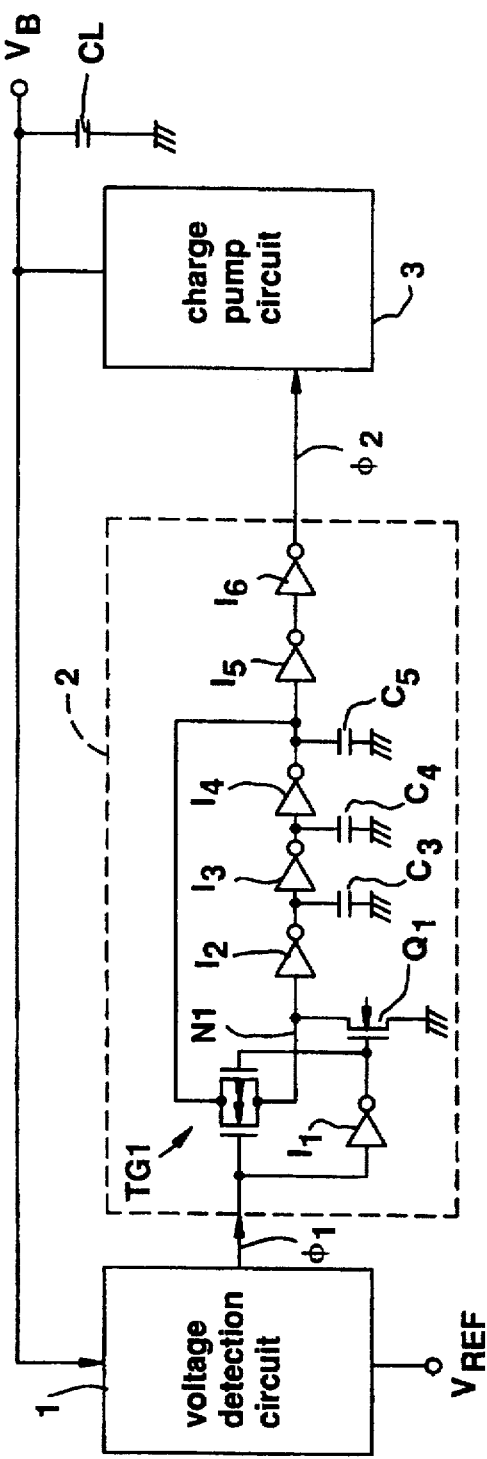
FIG. 1(A) shows an example of a booster circuit of the prior art.
Figure 1B:
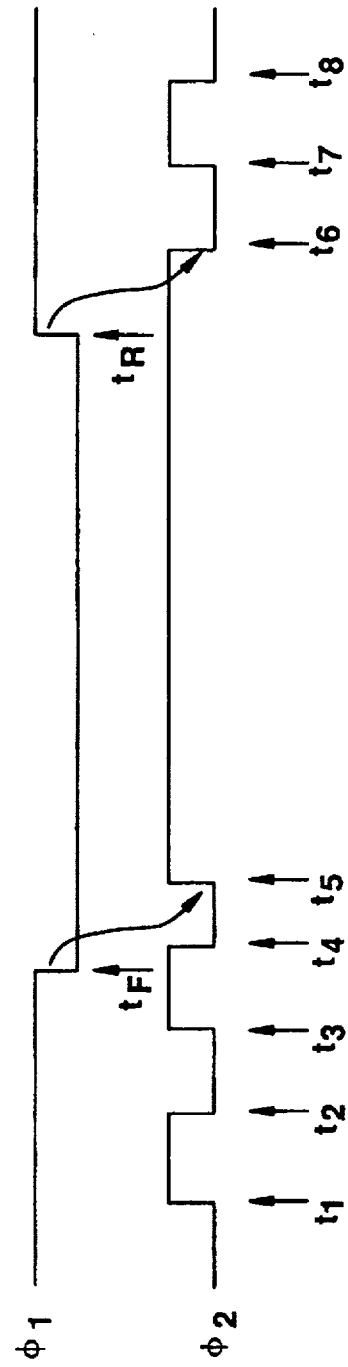
FIG. 1(B) is a waveform chart showing the operation of the circuit.
Figure 2:
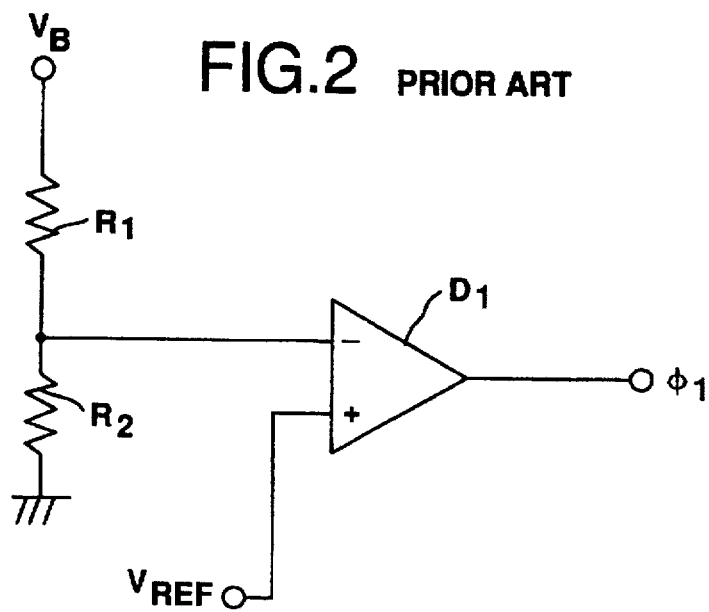
FIG. 2 shows one example of a voltage detection circuit.
Figure 3:
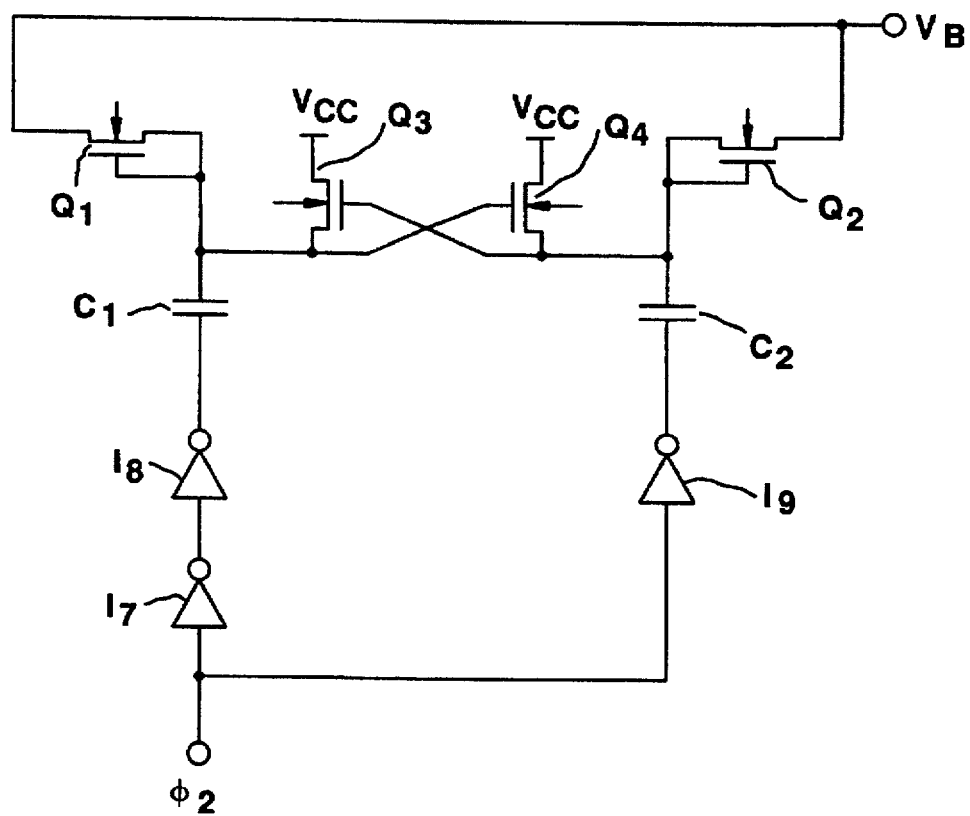
FIG. 3 shows one example of a charge pump circuit.
Figure 4:
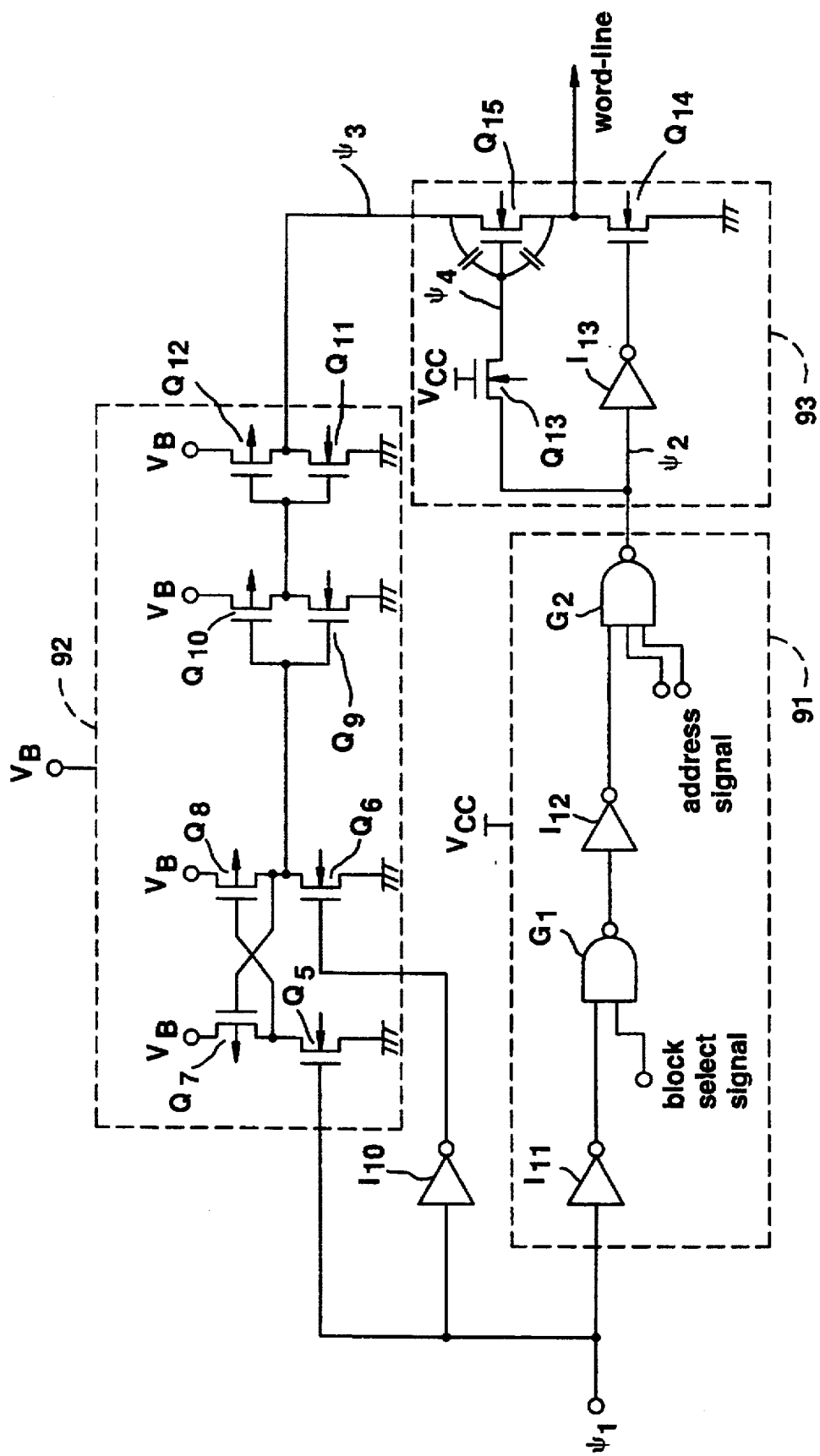
FIG. 4 shows one example of a DRAM word-line drive circuit.
Figure 5:
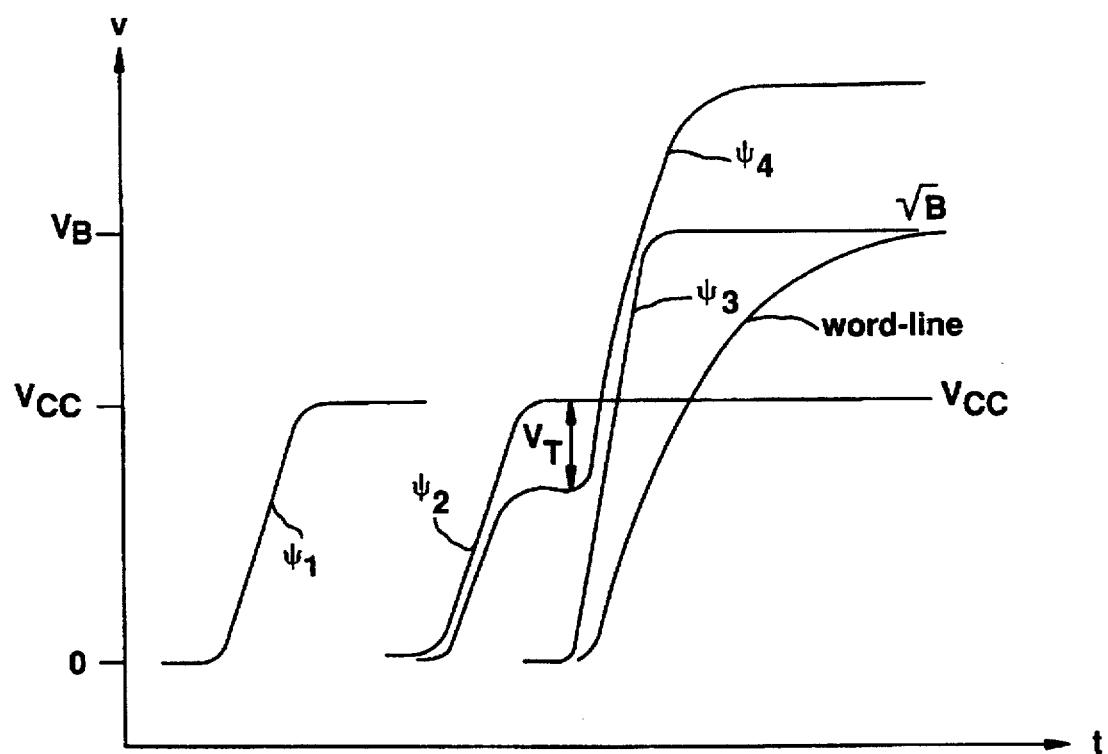
FIG. 5 is a waveform chart showing the operation of each section of the circuit of FIG. 4.
Figure 6A:
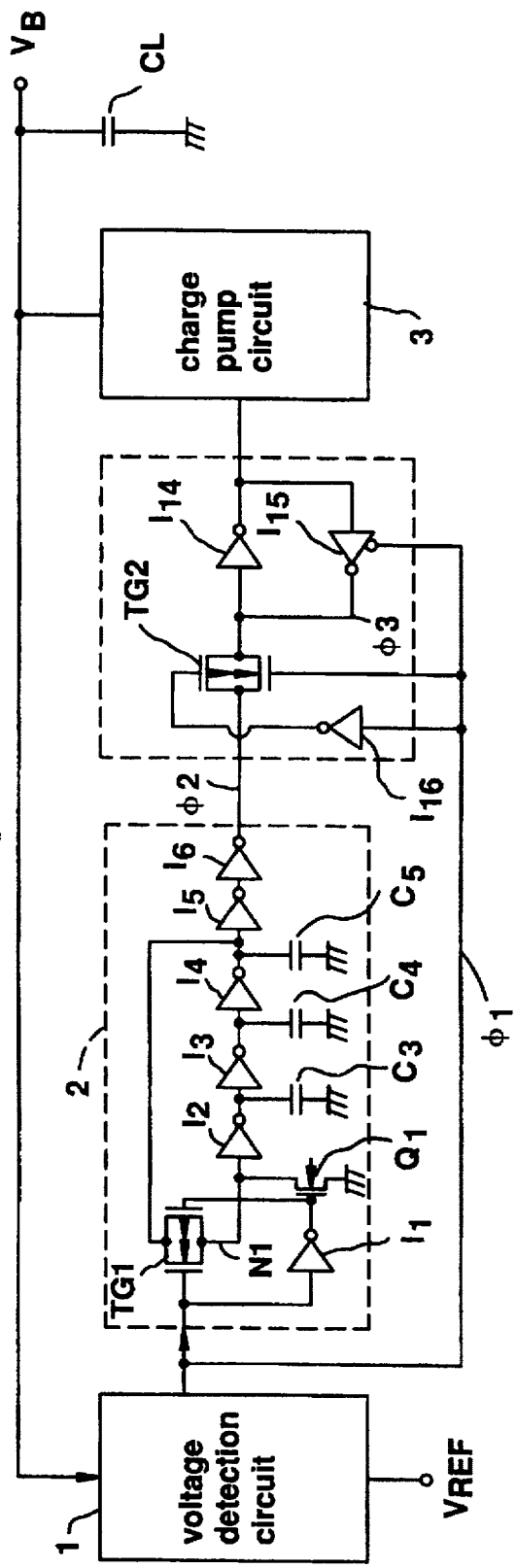
FIG. 6(A) is a circuit diagram showing one embodiment of the present invention.
Figure 6B:
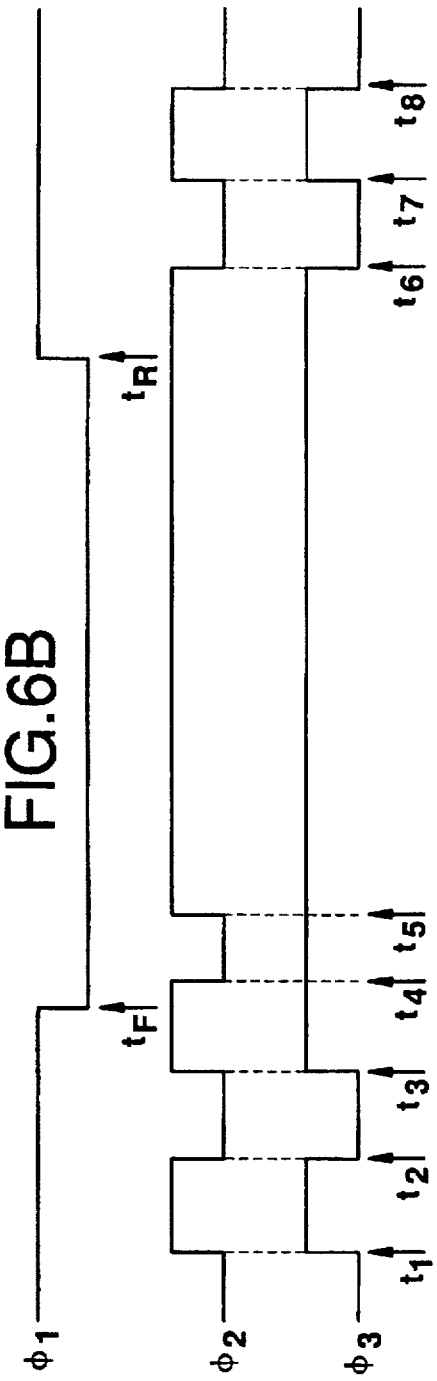
FIG. 6(B) is a waveform chart showing the operation of the circuit.

FIG. 6 shows one embodiment of the present invention, constituent elements equivalent to those of FIG. 1 being identified by the same reference numerals. FIG. 6(A) shows an example of the circuit, and FIG. 6(B) shows examples of operating waveform of the circuit.

In comparison with the prior-art example shown in FIG. 1(A), the embodiment shown in FIG. 6(A) additionally includes a transfer control circuit 4 constructed from transfer gate $TG_2$ and a latch circuit using a clocked inverter. Transfer gate $TG_2$ is controlled by oscillation control signal $\phi_1$, which is the judgment output signal of voltage detection circuit 1, and is configured so as to turn ON when signal $\phi_1$ is high level, i.e., when the potential of $V_B$ is lower than the set value; and to turn OFF when signal $\phi_1$ is low level, i.e., when the potential of $V_B$ is higher than the set value. In addition, the latch circuit is constructed so as to latch, as signal $\phi_3$, the oscillator circuit output $\phi_2$ outputted immediately before transfer gate $TG_2$ turns off for the time during which transfer gate $TG_2$ is OFF, i.e., while signal $\phi_1$ is low level. The latch circuit is made up of two inverters $I_{14}$ and $I_{15}$, inverter $I_{15}$ being a clocked inverter controlled by signal $\phi_1$.

The operation of the circuit will next be explained with reference to FIG. 6(B). When the potential of $V_B$ is lower than the set value, signal $\phi_1$ is high level, causing charge pump circuit 3 to operate from time $t_1$ to $t_3$, and thereby causing the potential of $V_B$ to rise accordingly. When the potential of $V_B$ becomes higher than the set value, signal $\phi_1$ changes to low level (at time $t_F$), whereupon transfer gate $TG_2$ turns OFF and the latch circuit simultaneously latches the potential of signal $\phi_2$ at time $t_F$ and holds signal $\phi_3$.

After $t_F$, signal $\phi_2$ undergoes transition at $t_4$ and $t_5$ as in a circuit of the prior art, but these transitions are not conveyed to charge pump circuit 3 because transfer gate $TG_2$ is OFF. In other words, this embodiment is characterized in that the potential of $V_B$ does not overly exceed the set value because the operation of charge pump circuit 3 is halted immediately upon detection that the potential of $V_B$ is higher than the set value.

Figure 7A:
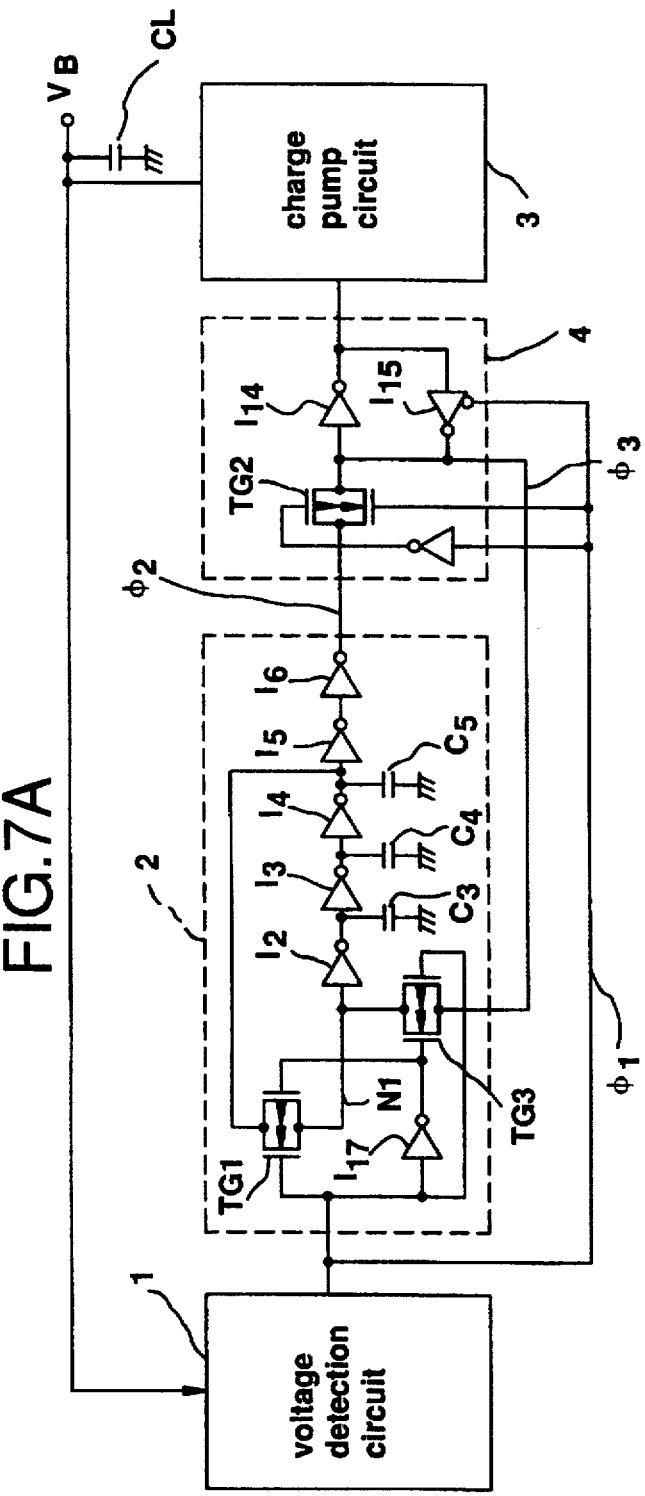
FIG. 7(A) is a circuit diagram of another embodiment of the present invention.
Figure 7B:
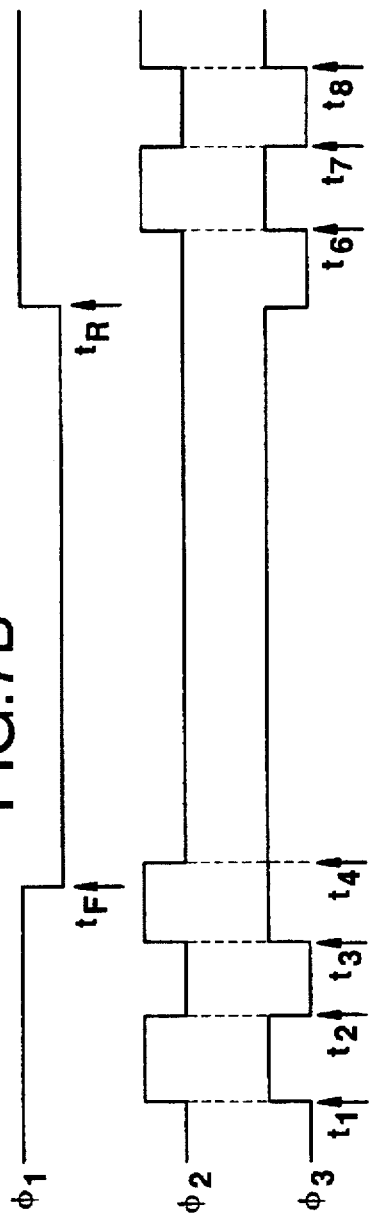
FIG. 7(B) is a waveform chart of the operation of the circuit.

FIG. 7(A) is a circuit diagram showing another embodiment of the present invention, and FIG. 7(B) is an example of a timing chart illustrating the operation of this circuit. In comparison with the embodiment of FIG. 6(A), this embodiment is provided with a transfer gate $TG_3$ controlled by signal $\phi_1$ in place of transistor $Q_1$ of oscillator circuit 2, and the logic of latch signal $\phi_2$ is made the reverse phase of latch signal $\phi_3$ during the time signal $\phi_1$ is low level by returning latch signal $\phi_3$ to oscillator circuit 2.

Referring to FIG. 7(B), during the time that the potential of $V_B$ is higher than the set value and signal $\phi_1$ is low level, signal $\phi_2$ is the reverse phase of signal $\phi_3$. Then, when the potential of $V_B$ falls below the set value due to, for example, current consumption by the load of $V_B$, signal $\phi_1$ changes to high level (at time $t_R$), whereupon transfer gate $TG_2$ turns ON and signal $\phi_3$ instantly undergoes transition and places charge pump circuit 3 in operation.

In other words, when it is judged that the potential of $V_B$ is lower than the set value, this judgment output directly brings the charge pump circuit into operation, and this embodiment is therefore characterized by instantaneous response in which no time is expended from judgment until the start of operation of the charge pump circuit, thereby preventing further fall of the potential of $V_B$ below the set value. In addition, this embodiment is at the same time characterized in that the potential of $V_B$ does not overly exceed the set value, as shown in FIG. 6. In other words, this embodiment has the effect of greatly suppressing fluctuation in the potential of $V_B$.

As explained hereinabove, the present invention exhibits the effect of drastically limiting fluctuation of the boosted voltage with respect to a set value of voltage because ON/OFF-control of the charge pump circuit generating the boosted voltage is performed instantaneously in response to detection that the boosted voltage is higher or lower than the set value. For example, when the compensatory capacitance $C_L$ of $V_B$ was 5nF and the prior-art booster circuit was used for word-line drive, the fluctuation of the potential of $V_B$ was about ±100 mV. In contrast, by using the example of a booster circuit according to the present invention shown in FIG. 7(A), the fluctuation in potential of $V_B$ can be suppressed to about ±50 mV, or about half that of the prior-art example. This effect leads to stability in the operation speed of circuits using $V_B$, and as a result, the timing of word-line rise or sense amplifier activation in DRAM can be accelerated. Moreover, the booster circuit and control method of the present invention need not be limited to booster circuits for word-line drive, but may also be applied to control of any circuit using a charge pump, such as in substrate potential generating circuits in DRAM.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A booster circuit for obtaining a boosted voltage for use in a semiconductor integrated circuit device, comprising:

a voltage detection circuit for detecting the level of a boosted voltage with respect to a reference voltage;

a pulse oscillation circuit that generates an oscillating pulse when the boosted voltage is lower than the reference voltage and halts generation of an oscillating pulse when the boosted voltage is higher than the reference voltage in accordance with a detection output signal received from the voltage detection circuit;

a transfer circuit receiving the oscillating pulse from the pulse oscillation circuit and controlling transfer of the oscillating pulse through the transfer circuit in accordance with the detection output signal received from the voltage detection circuit; and a charge pump circuit located downstream of the transfer circuit, said charge pump circuit operable for charging capacitors using the oscillating pulse transferred by said transfer circuit to thereby generate said boosted voltage.

2. A booster circuit according to claim 1, wherein said transfer circuit comprises:

a switch that permits transfer of oscillating pulses when said detection output signal indicates that the boosted voltage is lower than the reference voltage, and prevents transfer of the oscillating pulse when said detection output signal indicates that the boosted voltage is higher than the reference voltage, and a latch that, when said switch turns OFF, latches and holds transfer output of said switch immediately upon switching to said OFF state.

3. A booster circuit according to claim 2 wherein said pulse oscillation circuit is responsive to the latch signal received from said latch during the time the boosted voltage is higher than the reference voltage and reverses the logic of output signals of the pulse oscillation circuit with respect to logic of said latch signal.

* * * * *